United States Patent
Li et al.

(10) Patent No.: US 10,152,771 B1
(45) Date of Patent: Dec. 11, 2018

(54) CORRECTION OF MOTION-BASED INACCURACY IN POINT CLOUDS

(71) Applicant: SZ DJI TECHNOLOGY CO., LTD., Shenzhen (CN)

(72) Inventors: Chen Li, Shenzhen (CN); Lu Ma, Shenzhen (CN)

(73) Assignee: SZ DJI Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/729,533

(22) Filed: Oct. 10, 2017

Related U.S. Application Data

(63) Continuation of application No. PCT/CN2017/095300, filed on Jul. 31, 2017.

(51) Int. Cl.
*G06K 9/00* (2006.01)
*G06T 5/00* (2006.01)
*G06T 7/246* (2017.01)

(52) U.S. Cl.
CPC .......... *G06T 5/001* (2013.01); *G06K 9/00791* (2013.01); *G06T 7/251* (2017.01); *G06T 2207/10028* (2013.01); *G06T 2207/30252* (2013.01)

(58) Field of Classification Search
CPC ............... G06T 5/001; G06T 7/251; G06T 2207/10028; G06T 2207/30252; G06K 9/00791
See application file for complete search history.

(56) References Cited

U.S. PATENT DOCUMENTS

| | | |
|---|---|---|
| 4,283,116 A | 8/1981 | Weis |
| 5,179,565 A | 1/1993 | Tsuchiya et al. |
| 5,249,046 A | 9/1993 | Ulich et al. |
| 6,101,455 A | 8/2000 | Davis |
| 6,246,258 B1 | 6/2001 | Lesea |
| 6,344,937 B1 | 2/2002 | Sparrold et al. |
| 6,666,855 B2 | 12/2003 | Somani et al. |
| 7,085,400 B1 | 8/2006 | Holsing et al. |
| 7,236,299 B1 | 6/2007 | Smith et al. |
| 7,336,407 B1 | 2/2008 | Adams et al. |

(Continued)

FOREIGN PATENT DOCUMENTS

| | | |
|---|---|---|
| CN | 101216562 A | 7/2008 |
| CN | 101256232 A | 9/2008 |

(Continued)

OTHER PUBLICATIONS

International Searching Authority, International Search Report and the Written Opinion of the International Searching Authority, PCT Application PCT/CN2017/078611, dated Dec. 29, 2017, 12 pages.

(Continued)

*Primary Examiner* — Shefali Goradia
(74) *Attorney, Agent, or Firm* — Perkins Coie LLP

(57) ABSTRACT

Correcting motion-based inaccuracy in point cloud data generated by one or more sensors carried by a scanning platform, and associated systems and methods are disclosed herein. A representative method includes associating a motion model with a target object of the point cloud, estimating adjusting factors based on the motion model, and adjusting scanning points in the point cloud using the adjusting factors.

45 Claims, 6 Drawing Sheets

(56) References Cited

U.S. PATENT DOCUMENTS

| | | | |
|---|---|---|---|
| 7,564,571 B2 | 7/2009 | Karabassi et al. | |
| 7,843,448 B2 | 11/2010 | Wheeler et al. | |
| 7,899,598 B2 * | 3/2011 | Woon | E02F 3/842 172/1 |
| 8,224,097 B2 | 7/2012 | Matei et al. | |
| 8,396,293 B1 | 3/2013 | Korah et al. | |
| 8,488,877 B1 | 7/2013 | Owechko et al. | |
| 8,503,046 B2 | 8/2013 | Mikkelsen et al. | |
| 8,605,998 B2 | 12/2013 | Samples et al. | |
| 8,620,089 B1 | 12/2013 | Korah et al. | |
| 8,665,122 B2 | 3/2014 | Klepsvik | |
| 8,773,182 B1 | 7/2014 | Degani et al. | |
| 8,798,372 B1 | 8/2014 | Korchev et al. | |
| 9,076,219 B2 | 7/2015 | Cha et al. | |
| 9,097,804 B1 | 8/2015 | Silver et al. | |
| 9,098,753 B1 | 8/2015 | Zhu et al. | |
| 9,128,190 B1 | 9/2015 | Ulrich et al. | |
| 9,369,697 B2 | 6/2016 | Kumagai et al. | |
| 9,383,753 B1 * | 7/2016 | Templeton | G05D 1/0246 |
| 9,396,545 B2 | 7/2016 | Fu et al. | |
| 9,470,548 B2 | 10/2016 | Ahn et al. | |
| 9,584,748 B2 | 2/2017 | Saito | |
| 9,644,857 B1 * | 5/2017 | Ashgriz | F24F 11/006 |
| 9,659,378 B2 | 5/2017 | Sasaki et al. | |
| 2005/0248749 A1 | 11/2005 | Kiehn et al. | |
| 2005/0254628 A1 | 11/2005 | Saladin et al. | |
| 2007/0214687 A1 * | 9/2007 | Woon | E02F 3/842 37/415 |
| 2007/0296951 A1 | 12/2007 | Kuijk et al. | |
| 2008/0114253 A1 | 5/2008 | Randall et al. | |
| 2008/0319706 A1 | 12/2008 | Uffenkamp et al. | |
| 2009/0310867 A1 | 12/2009 | Matei et al. | |
| 2010/0271615 A1 * | 10/2010 | Sebastian | G01C 11/02 356/4.01 |
| 2011/0285981 A1 | 11/2011 | Justice et al. | |
| 2012/0032541 A1 | 2/2012 | Chen et al. | |
| 2012/0121166 A1 | 5/2012 | Ko et al. | |
| 2012/0170024 A1 | 7/2012 | Azzazy et al. | |
| 2012/0170029 A1 | 7/2012 | Azzazy et al. | |
| 2012/0248288 A1 | 10/2012 | Linder et al. | |
| 2012/0256916 A1 | 10/2012 | Kitamura et al. | |
| 2013/0284475 A1 | 10/2013 | Hirabayashi et al. | |
| 2014/0049765 A1 | 2/2014 | Zheleznyak et al. | |
| 2014/0071121 A1 * | 3/2014 | Russ | G01S 17/89 345/419 |
| 2014/0368651 A1 | 12/2014 | Irschara et al. | |
| 2015/0185313 A1 | 7/2015 | Zhu | |
| 2015/0206023 A1 | 7/2015 | Kochi et al. | |
| 2015/0219920 A1 | 8/2015 | Ando et al. | |
| 2016/0070981 A1 | 3/2016 | Sasaki et al. | |
| 2016/0154999 A1 | 6/2016 | Fan et al. | |
| 2016/0311528 A1 | 10/2016 | Nemovi et al. | |
| 2016/0327779 A1 | 11/2016 | Hillman | |
| 2017/0046840 A1 | 2/2017 | Chen et al. | |
| 2017/0046845 A1 | 2/2017 | Boyle et al. | |
| 2017/0153319 A1 | 6/2017 | Villeneuve et al. | |
| 2017/0178352 A1 | 6/2017 | Harmsen et al. | |
| 2017/0227628 A1 | 8/2017 | Zheleznyak et al. | |
| 2017/0248698 A1 * | 8/2017 | Sebastian | G01S 17/023 |
| 2017/0316701 A1 | 11/2017 | Gil et al. | |

FOREIGN PATENT DOCUMENTS

| | | |
|---|---|---|
| CN | 202182717 U | 4/2012 |
| CN | 102508255 A | 6/2012 |
| CN | 102944224 A | 2/2013 |
| CN | 102971657 A | 3/2013 |
| CN | 103257342 A | 8/2013 |
| CN | 103257348 A | 8/2013 |
| CN | 103403577 A | 11/2013 |
| CN | 103499819 A | 1/2014 |
| CN | 203645633 U | 6/2014 |
| CN | 103969637 A | 8/2014 |
| CN | 103983963 A | 8/2014 |
| CN | 104463872 A | 3/2015 |
| CN | 104600902 A | 5/2015 |
| CN | 105517903 A | 4/2016 |
| CN | 105628026 A | 6/2016 |
| CN | 105759253 A | 7/2016 |
| CN | 106019296 A | 10/2016 |
| CN | 106019923 A | 10/2016 |
| CN | 106030431 A | 10/2016 |
| CN | 106063089 A | 10/2016 |
| CN | 106093958 A | 11/2016 |
| CN | 106093963 A | 11/2016 |
| CN | 106199622 A | 12/2016 |
| CN | 106597416 A | 4/2017 |
| CN | 107037721 A | 8/2017 |
| JP | 63194211 A | 8/1988 |
| JP | 2002199682 A | 7/2002 |
| JP | 2005321547 A | 11/2005 |
| JP | 2015200555 A | 11/2015 |
| JP | 6076541 B2 | 2/2017 |
| KR | 101665938 B1 | 10/2016 |
| WO | 2015148824 A1 | 10/2015 |
| WO | 2016127357 A1 | 8/2016 |
| WO | 2016170333 A1 | 10/2016 |
| WO | 2017021778 A2 | 2/2017 |

OTHER PUBLICATIONS

Aijazi, et al., "Segmentation Based Classification of 3D Urban Point Clouds: A Super-Voxel Based Approach with Evaluation," (2013), 27 pages.

Douillard, et al., "On the Segmentation of 3D LIDAR Point Clouds," (2011), 8 pages.

Hackel, et al., "Fast Semantic Segmentation of 3D Point Clouds with Strongly Varying Density," (2016), 8 pages.

Levinson, et al., "Automatic Online Calibration of Cameras and Lasers," (2013), 8 pages.

Liu, et al., "A 3.9 ps RMS Resolution Time-To-Digital Converter Using Dual-sampling Method on Kintex UltraScale FPGA," (2006), 2 pages.

Montemerlo, et al., "Junior: The Stanford Entry in the Urban Challenge," (2008), 31 pages.

Palka, et al., "A Novel Method Based Solely on FPGA Units Enabling Measurement of Time and Charge of Analog Signals in Positron Emission Tomography," (2014), 6 pages.

Raismian, "Google Cars Autonomous Driving," (2017), 1 pages.

Schwarze, "A New Look at Risley Prisms," (2006), 5 pages.

Tongtong, et al., "Gaussian-Process-Based Real-Time Ground Segmentation for Autonomous Land Vehicles," (2014), 25 pages.

Wu, et al., "Several Key Issues on Implementing Delay Line Based TDCs using FPGA," (2009), 6 pages.

International Searching Authority, The International Search Report and Written Opinion of the International Searching Authority, PCT/CN2017/095300, dated Apr. 27, 2018, 9 pages.

* cited by examiner

CORRECTION OF MOTION-BASED INACCURACY IN POINT CLOUDS

CROSS REFERENCE TO RELATED APPLICATIONS

The present application is a continuation of International Patent Application No. PCT/CN17/95300, filed Jul. 31, 2017, which is incorporated herein by reference.

TECHNICAL FIELD

The present technology is generally directed to the correction of motion-based inaccuracy in point clouds, for example, generated by one or more emitter/detector sensors (e.g., laser sensors) that are carried by a scanning platform.

BACKGROUND

The surrounding environment of a scanning platform can typically be scanned or otherwise detected using one or more emitter/detector sensors. Emitter/detector sensors, such as LiDAR sensors, typically transmit a pulsed signal (e.g. laser signal) outwards, detect the pulsed signal reflections, and identify three-dimensional information (e.g., laser scanning points) in the environment to facilitate object detection and/or recognition. Typical emitter/detector sensors can provide three-dimensional geometry information (e.g., scanning points represented in a three-dimensional coordinate system associated with the sensor or scanning platform) accumulated over short periods of time. The information obtained regarding the positions of objects can facilitate the process of detecting pedestrians, vehicles, and/or other objects in the environment, thereby providing a basis for target tracking, obstacle avoidance, route planning, and/or other applications in automated or assisted navigation operations. However, inaccuracies exist at least partly due to the accumulation of scanning points, which can affect various higher level applications. Accordingly, there remains a need for improved sensing techniques and devices.

SUMMARY

The following summary is provided for the convenience of the reader and identifies several representative embodiments of the disclosed technology.

In some embodiments, a computer-implemented method for adjusting point clouds generated using at least a scanning unit carried by a scanning platform, includes obtaining a base point cloud comprising a plurality of scanning points that are produced by the scanning unit during a period of time, wherein each of the scanning points indicates a position of at least a portion of a target object and wherein the target object is associated with a motion model. The method can further include determining one or more adjusting factors applicable to the scanning points based, at least in part, on the motion model, and transforming at least one subset of the scanning points based, at least in part, on the one or more adjusting factors to generate an adjusted point cloud of the target object.

In some embodiments, the positions indicated by at least two of the scanning points correspond to different timepoints. In some embodiments, the positions indicated by at least two of the scanning points correspond to different portions of the target object. In some embodiments, the scanning points are represented within a three-dimensional reference system associated with the scanning unit or the scanning platform. In some embodiments, the motion model includes a translational motion component, and/or a rotational motion component. In some embodiments, the translational motion component includes a constant translational speed factor. In some embodiments, the motion model includes rotational motion component. In some embodiments, the rotational motion component includes a constant rotational speed factor.

In some embodiments, determining the one or more adjusting factors comprises assessing a point cloud measurement based, at least in part, on a volume relating to the scanning points. In some embodiments, assessing the point cloud measure includes applying the motion model to the scanning points and searching for a minimized quantity of volume pixels (voxels) occupied by the scanning points at a target timepoint in accordance with the applying of the motion model. In some embodiments, assessing the point cloud measure includes applying the motion model to the scanning points and searching for a minimized volume enclosed by the scanning points at a target timepoint in accordance with the applying of the motion model.

In some embodiments, the target timepoint corresponds to the end of the period of time. In some embodiments, the one or more adjusting factors include at least one of a translational velocity or an rotational speed. In some embodiments, transforming the at least one subset of the scanning points comprises relocating each scanning point of the subset based, at least in part, on the one or more adjusting factors. In some embodiments, relocating each scanning point is based, at least in part, on movements associated with the scanning point between a timepoint when the scanning point was produced and a subsequent target timepoint. In some embodiments, a relative distance between the target object and the scanning platform changes during the period of time.

In some embodiments, the scanning platform includes at least one of an unmanned aerial vehicle (UAV), a manned aircraft, an autonomous car, a self-balancing vehicle, a robot, a smart wearable device, a virtual reality (VR) head-mounted display, or an augmented reality (AR) head-mounted display. In some embodiments, the method further includes locating the target object based, at least in part, on the adjusted point cloud.

Any of the foregoing methods can be implemented via a non-transitory computer-readable medium storing computer-executable instructions that, when executed, cause one or more processors associated with a scanning platform to perform corresponding actions, or via a vehicle including a programmed controller that at least partially controls one or more motions of the vehicle and that includes one or more processors configured to perform corresponding actions.

DETAILED DESCRIPTION

1. Overview

Figure 1A:
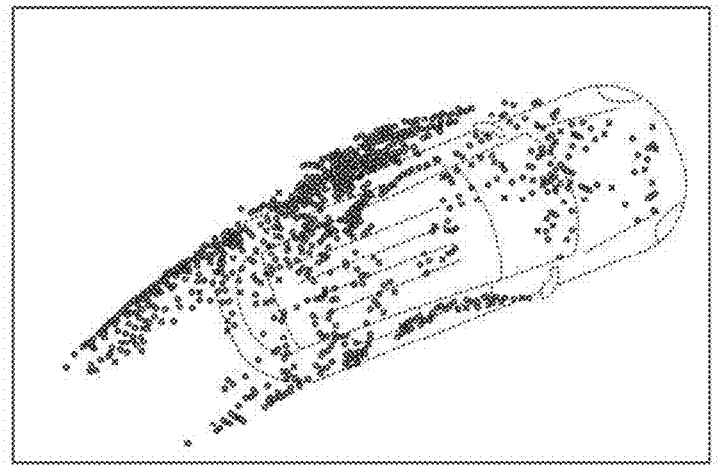
FIG. 1A illustrates an example point cloud of a target vehicle that includes both translational and rotational motion-based inaccuracies.

When scanning an object using emitter/detector sensor(s) (e.g., a LiDAR sensor), relative movement between the scanned object and the sensor(s) (e.g., carried by a mobile scanning platform) can cause inaccuracies (e.g., smearing or blurring) in a three-dimensional (3D) point cloud that includes scanning points accumulated over a period of time. Because inaccurate scanning points do not reflect the true positions of the object (or portions thereof), the reconstructed object based on the 3D point cloud can be inaccurate, thus affecting high level applications such as object tracking, obstacle avoidance, or the like. The presently disclosed technology can use a conventional 3D point cloud as input, analyze the scanning results of the moving object, and correct the motion-based inaccuracy in accordance with motion-model(s). Corrected or adjusted point clouds generated based on the presently disclosed technology can facilitate efficient and accurate object detection or recognition, thus providing a reliable basis for various applications in automated or assisted navigation processes.

Several details describing structures and/or processes that are well-known and often associated with scanning platforms (e.g., UAVs or other types of movable platforms) and corresponding systems and subsystems, but that may unnecessarily obscure some significant aspects of the presently disclosed technology, are not set forth in the following description for purposes of clarity. Moreover, although the following disclosure sets forth several embodiments of different aspects of the presently disclosed technology, several other embodiments can have different configurations or different components than those described herein. Accordingly, the presently disclosed technology may have other embodiments with additional elements and/or without several of the elements described below with reference to FIGS. 1-7.

FIGS. 1-7 are provided to illustrate representative embodiments of the presently disclosed technology. Unless provided for otherwise, the drawings are not intended to limit the scope of the claims in the present application.

Many embodiments of the technology described below may take the form of computer- or controller-executable instructions, including routines executed by a programmable computer or controller. The programmable computer or controller may or may not reside on a corresponding scanning platform. For example, the programmable computer or controller can be an onboard computer of the scanning platform, or a separate but dedicated computer associated with the scanning platform, or part of a network or cloud based computing service. Those skilled in the relevant art will appreciate that the technology can be practiced on computer or controller systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers and the like). Information handled by these computers and controllers can be presented at any suitable display medium, including an LCD (liquid crystal display). Instructions for performing computer- or controller-executable tasks can be stored in or on any suitable computer-readable medium, including hardware, firmware or a combination of hardware and firmware. Instructions can be contained in any suitable memory device, including, for example, a flash drive, USB (universal serial bus) device, and/or other suitable medium. In particular embodiments, the instructions are accordingly non-transitory.

2. Representative Embodiments

Figure 1B:
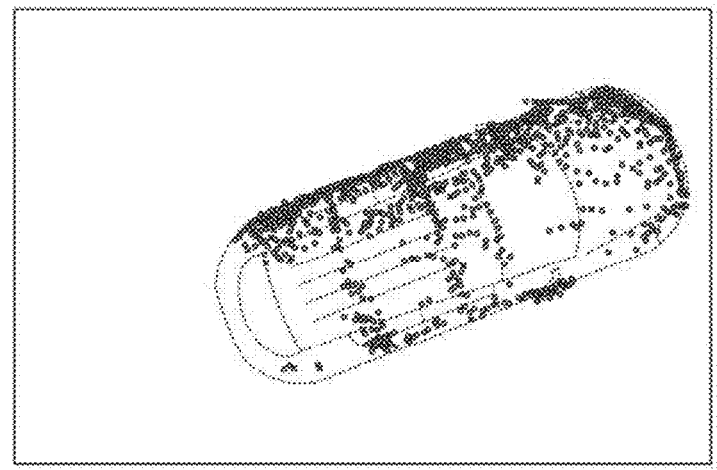
FIG. 1B illustrates an example point cloud of the target vehicle of FIG. 1A without motion-based inaccuracy.

A typical 3D point cloud can include scanning points accumulated over one or more periods of time (e.g., one frame or a few consecutive frames produced by the sensor(s)). When a target object being scanned moves relative to the sensor(s) during the time period(s), certain portions of the point cloud can indicate false positions of the object in space (with respect to a current timepoint), creating smearing, blurring, or dragging "shadow" effects. The length and shape of the shadow can depend on the nature of the target object's relative movement. For example, translational motion of the target object can contribute to a flat, rectangular shadow, while rotational motion can leave an arc-like trajectory. FIG. 1A illustrates an example point cloud of a target vehicle that includes both translational and rotational motion-based inaccuracies, and FIG. 1B illustrates an example point cloud of the target vehicle without the motion-based inaccuracies.

Because the motion of an object in space can be arbitrary, the mathematical description of motion-based inaccuracies can be complicated. Conventional point cloud processing systems do not optimize and deal with this phenomenon, and simply treat portions of the false point cloud as if the purported portion of the object exists in the physical space. However, this false sense of object shape and/or position can contribute to erroneous estimates or overly conservative decision-making in target tracking, obstacle avoidance, path planning, and/or other applications.

Figure 2:
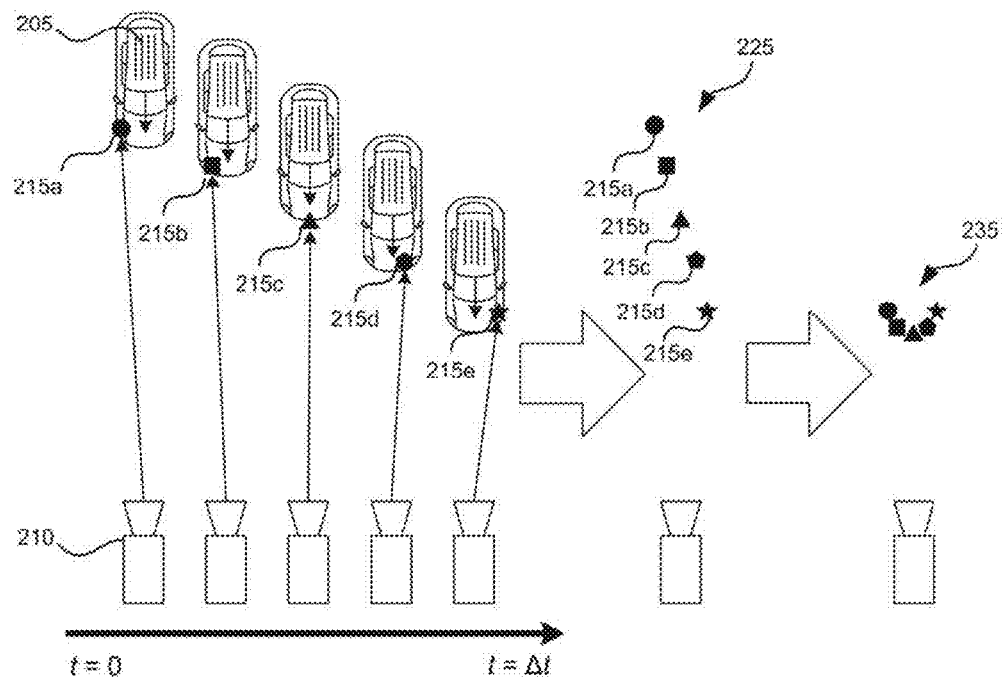
FIG. 2 illustrates processes for generating a base point cloud and correcting motion-based inaccuracies in accordance with some embodiments of the presently disclosed technology.

FIG. 2 illustrates processes for generating a base point cloud and correcting motion-based inaccuracies in accordance with some embodiments of the presently disclosed technology. As shown in FIG. 2, during a time period [0 a sensor 210 scans a target object 205. Scanning points 215a-215e are produced at individual timepoints [0001], within the time period. In other words, each scanning point 215a-215e reflects the distance of a portion the target object 205 from the sensor 210, at a corresponding timepoint. If the target object 205 is moving relative to the sensor 210 during the time period [0, any point scanned by the sensor 210 before the timepoint [0001] reflects a distance between the target object portion and the sensor 210 at some time in the past (and therefore the distance is longer than it should be).

These scanning points 215a-215e are typically accumulated in a single or common coordinate system to form a base point cloud 225.

The base point cloud 225, therefore, includes information that reflects the trajectory of the target object 205 (or a portion thereof) as it moves during the time period [0. The length and shape of the base point cloud 225 depends, at least in part, on the actual movement of the target object 205 during the scanning time period. The presently disclosed technology can generate a corrected or adjusted point cloud 235 via relocating at least a subset of the scanning points 215a-215e, so that the corrected or adjusted point cloud 235 more accurately reflects the shape and/or distance of at least some portion of the target object 205 (e.g., the front of a car as illustrated in FIG. 2) at a specific timepoint (e.g., the timepoint [0001).

Figure 3:
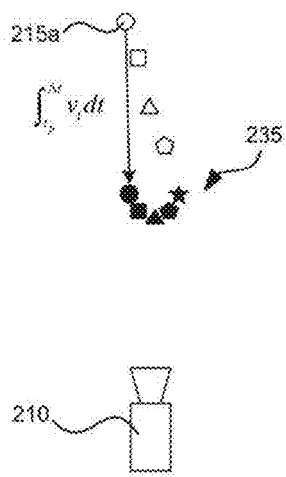
FIG. 3 illustrates a process for relocating scanning points based on a motion model, in accordance with some embodiments of the presently disclosed technology.

FIG. 3 illustrates a process for relocation scanning points (e.g., scanning points 215a-215d of FIG. 2) based on a motion model, in accordance with some embodiments of the presently disclosed technology. The set of scanning points included in the base point cloud of a target object (e.g., the base point cloud 225 of target object 205 as illustrated in FIG. 2) can be expressed as $$P_{\Delta t} = \cup_{p \in P_{\Delta t}} p,$$

where each scanning point [0001] is associated with a scanning timepoint [0| when the scanning point was collected or produced.

If the target object travels at a velocity [0 at timepoint [, a corrected or adjusted point cloud after scanning points relocation can include the following set:

$$P'_{\Delta t} = \cup_{p \in P_{\Delta t}} (p + \int_{t_p}^{\Delta t} v_t dt) \quad (1)$$

where the integral operation calculates the amount of additional displacement that each scanning point in the base point cloud should have incurred after the scanning timepoint [0. If both translational motion [0 and rotation motion [0 of the object occur, the set of points included in a corrected or adjusted point cloud can be expressed as:

$$P'_{\Delta t} = \cup_{p \in P_{\Delta t}} \int_{t_p}^{\Delta t} (r_t^*(p_t - c_t) + v_t) dt \quad (2)$$

where, [0 corresponds to a point (e.g., centroid of the object) about which the object rotates at timepoint [, [0 corresponds to the position of point [( at timepoint [, and mathematical operator [| stands for a corresponding rotation transformation.

Figure 4:
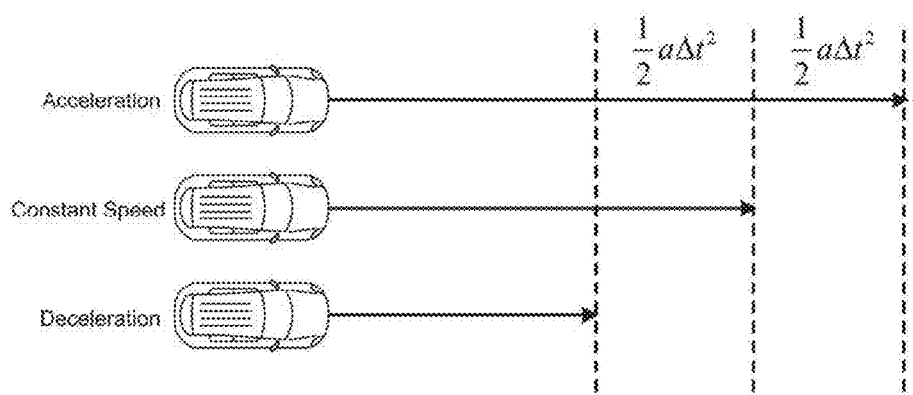
FIG. 4 illustrates a process for determining errors in accordance with some embodiments of the presently disclosed technology where uniform motion model(s) are used.

FIG. 4 illustrates a process for determining errors in accordance with some embodiments of the presently disclosed technology for which one or more uniform motion model(s) are used. Given actual linear speed [| and acceleration [( of a target object, the distance traveled by the target object in a time period [0 is:

$$S = \int_{t=0}^{t=\Delta t} (v + at) dt = v\Delta t + \frac{1}{2} a \Delta t^2 \quad (3)$$

A similar analysis can be applied to a target object that decelerates. Therefore, as illustrated in FIG. 4, in embodiments for which uniform motion model(s) are used, an error of the corrected or adjusted point cloud corresponds to a distance of [0001, in a direction for acceleration, and in the opposite direction for deceleration. Given a limit or constraint on the target object acceleration [(, this error distance can be compared to a safe driving distance or other safety or operational threshold(s) of a desired application, so as to determine a maximum time period [0 for base point cloud generation.

Figure 5:
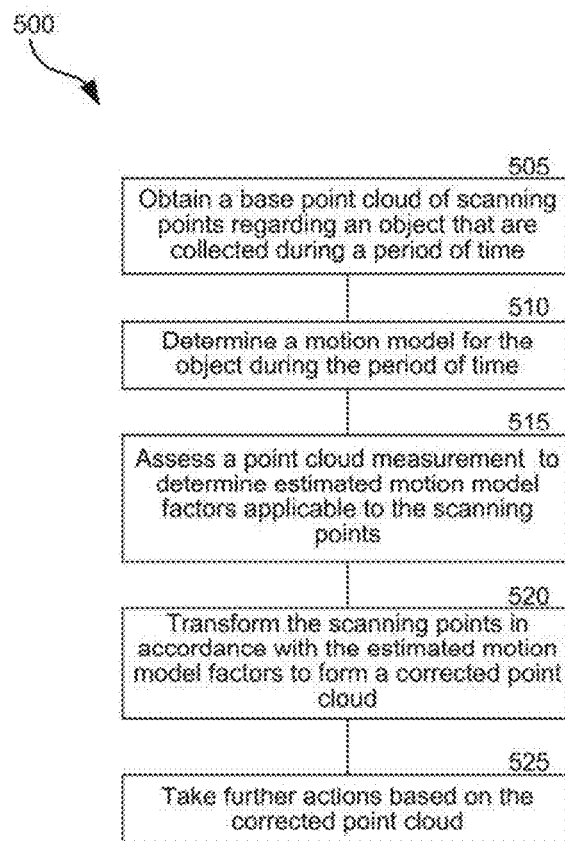
FIG. 5 is a flowchart illustrating a method for correction of motion-based inaccuracy in a point cloud in accordance with some embodiments of the presently disclosed technology.

FIG. 5 is a flowchart illustrating a method 500 for correcting one or more motion-based inaccuracies in a point cloud in accordance with some embodiments of the presently disclosed technology. The method of FIG. 5 can be implemented by a controller (e.g., an onboard computer of a scanning platform, an associated computing device, and/or an associated computing service).

At block 505, the method includes obtaining a base point cloud of scanning points regarding an object (e.g., a vehicle, pedestrian, aircraft, etc.). As discussed above, the scanning points are collected during a period of time, and individual scanning points can indicate the positions of different portions of the object at different timepoints. Illustratively, the base point cloud can include scanning points of a single frame produced by an emitter/detector sensor (e.g., a LiDAR sensor). Individual scanning points within a frame may not be generated simultaneously. For example, in some embodiments, although sensor data (e.g., scanning points) are collected continuously, frames of scanning points are generated or transmitted in accordance with some discrete time intervals. In other words, a frame may correspond to a set of sensor data (e.g., scanning points) accumulated over a certain duration of time (e.g., 0.1 second). In some embodiments, the base point cloud can also include scanning points of multiple, consecutive frames produced by one or more sensors.

At block 510, the method includes determining a motion model for the object's movement during the period of time. The motion model can include a translational motion component, a rotational motion component, an oscillatory motion component, and/or other motion components. Illustratively, formula (2) as discussed above can be selected as a motion model associated with the object during the period of time.

At block 515, the method includes assessing a point cloud measurement to determine estimated motion model factors applicable to the scanning points. Motion-based inaccuracy can cause a false, enlarged size of the base point cloud. Therefore, the method can include assessing volume or size related point cloud measurements in order to determine estimated motion model factors. Illustratively, the method can search for a minimized number of volume pixels or voxels (e.g., 0.001-cubic-meter cubes that evenly divide up the three-dimensional space surrounding the scanning platform), with each voxel containing at least one scanning point. Put another way, the fewest number of voxels that describe the point cloud can correspond to the closest approximation of the object in a stationary position. Mathematically, the minimization function can be expressed as:

$$\arg \min_{v,r} \text{GIRD}(\cup_{p \in P_{\Delta t}} \int_{t_p}^{\Delta t} (r^*(p_t - c_t) + v) dt) + E_s(v,r) \quad (4)$$

where [00 stand for constant translational velocity and rotational speed of the object (which are the motion model factors to be estimated), function [0001] calculates the quantity of voxels occupied by [(, and function [0001] can correspond to an a priori term for observing the translational velocity and rotational speed, which can take the following form:

$$[0001] E_s(v,r) = |v - v'| \quad (5)$$

where [000 can correspond to observations obtained from a different method of sensor (e.g., by aligning point clouds of the object corresponding to different times, or by using other sensor(s) such as laser tachometers or millimeter-wave radars). In some embodiments, formula (3) does not require the term [0001]. In these embodiments, the minimization search can be computationally more expensive (e.g., taking longer to converge).

The voxel quantity minimization process based on formula (4) can include determining multiple rotation centers [0 of the object. In some embodiments, for computational efficiency and expediency, the method includes a two-step approximation in which a translational transformation is followed by a rotational transformation. Illustratively, in these embodiments, the point cloud measurement assessment can be performed in accordance with the following formula:

$$[0001] \arg \min_{v,r} \text{GIRD}(r \cdot dt^* (\cup_{p \in P_{\Delta t}} (p + \int_{t_p}^{\Delta t} v \, dt) - C \quad (6)$$

where [( can correspond to a centroid point of an intermediate point cloud (e.g., [0001] $\cup_{p \in P_{\Delta t}}$ (in accordance with formula (1)) that is optimized only for the translation motion. In some embodiments, [( can be defined to correspond to other positions with respect to the intermediate point cloud (e.g., to indicate a mid-point between turning wheels of a car).

In some embodiments, the method can include assessing a volume enclosed by the point cloud. Similar to the voxel quantity assessment, this approach can use a motion model based formula to calculate a measure (e.g., a volume enclosed by the outer surface of the point cloud, such as a mesh connecting all outer surface scanning points). Different than the voxel quantity assessment which seeks to minimize a "skeleton" volume, the enclosed-volume assessment can assess the overall size of the point cloud. In some embodiments, the method can include assessing multiple measurements of the point cloud (e.g., both voxel quantity and enclosed-volume measurements), and calculating a weighted average of the estimated motion model factors that resulted from the multiple assessments. In some embodiments, the motion model(s) can include factor(s) of non-constant form. For example, the translational velocity and/or rotational speed of the object to be estimated can be defined as function(s) of time [.

In accordance with some embodiments, searching for a minimization of point cloud measurement (e.g., voxel quantity or enclosed-volume) can include finding a global or local minimized value of the measurement, or (e.g., for reasons of computational efficiency, constraints, and/or economy) simply finding a reduced (but not necessarily minimized) value of the measurement.

At block 520, the method includes transforming the scanning points in the base point cloud in accordance with the estimated motion model factors to form a corrected or adjusted point cloud. Illustratively, the method can include relocating at least a subset of scanning points initially included in the base point cloud based, at least in part, on the estimated translational velocity [( and/or estimated rotational speed [I, in accordance with an applicable motion model (e.g., formula (1) or formula (2)). The relocation moves each scanning point in the subset from a position at timepoint [0 when the scanning point was collected or produced to an estimated position of the scanning point at the end of the time period [0. The method can label or otherwise use the transformed scanning points in combination with any scanning points collected or produced at the end of the time period to form the corrected or adjusted point cloud for the object.

At block 525, the method includes taking one or more further actions based on the corrected or adjusted point cloud. Illustratively, the controller can determine the centroid, contour, shape, and/or can otherwise recognize the object based on the corrected point cloud, which can be more accurate than using the base point cloud. The controller can also determine distances between the sensor (or the scanning platform) and various portions of the object, based on the corrected point cloud, and thereby facilitate obstacle avoidance, target tracking, route planning, and/or other automated/assisted navigation applications. The method of FIG. 5 can be implemented in response to obtaining each frame of sensor data, in response to certain events (e.g., the scanning platform entering an area with an increased number of obstacles), and/or based on user commands.

Figure 6:
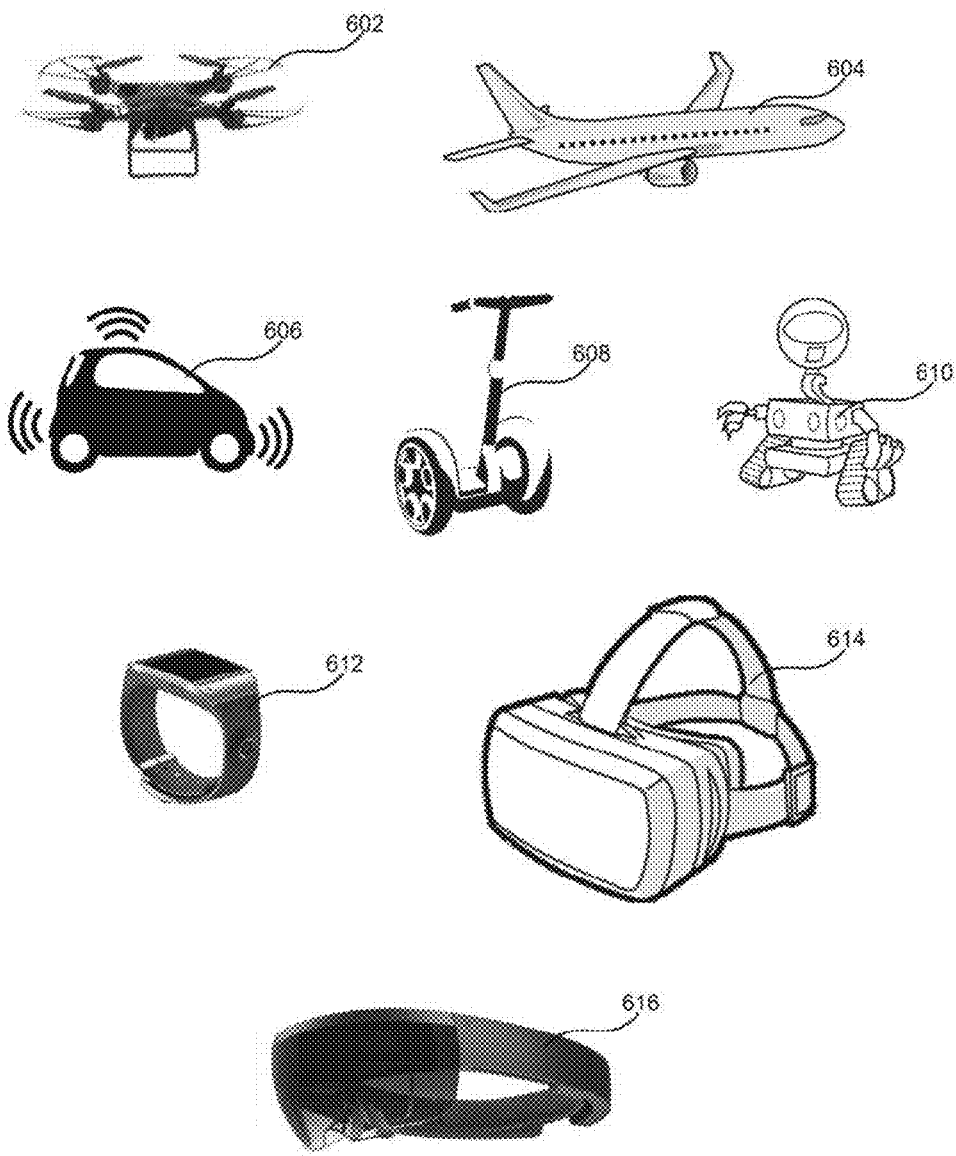
FIG. 6 illustrates examples of scanning platforms configured in accordance with various embodiments of the presently disclosed technology.

FIG. 6 illustrates examples of scanning platforms configured in accordance with various embodiments of the presently disclosed technology. As illustrated, a representative scanning platform as disclosed herein may include at least one of an unmanned aerial vehicle (UAV) 602, a manned aircraft 604, an autonomous car 606, a self-balancing vehicle 608, a terrestrial robot 610, a smart wearable device 612, a virtual reality (VR) head-mounted display 614, or an augmented reality (AR) head-mounted display 616.

Figure 7:
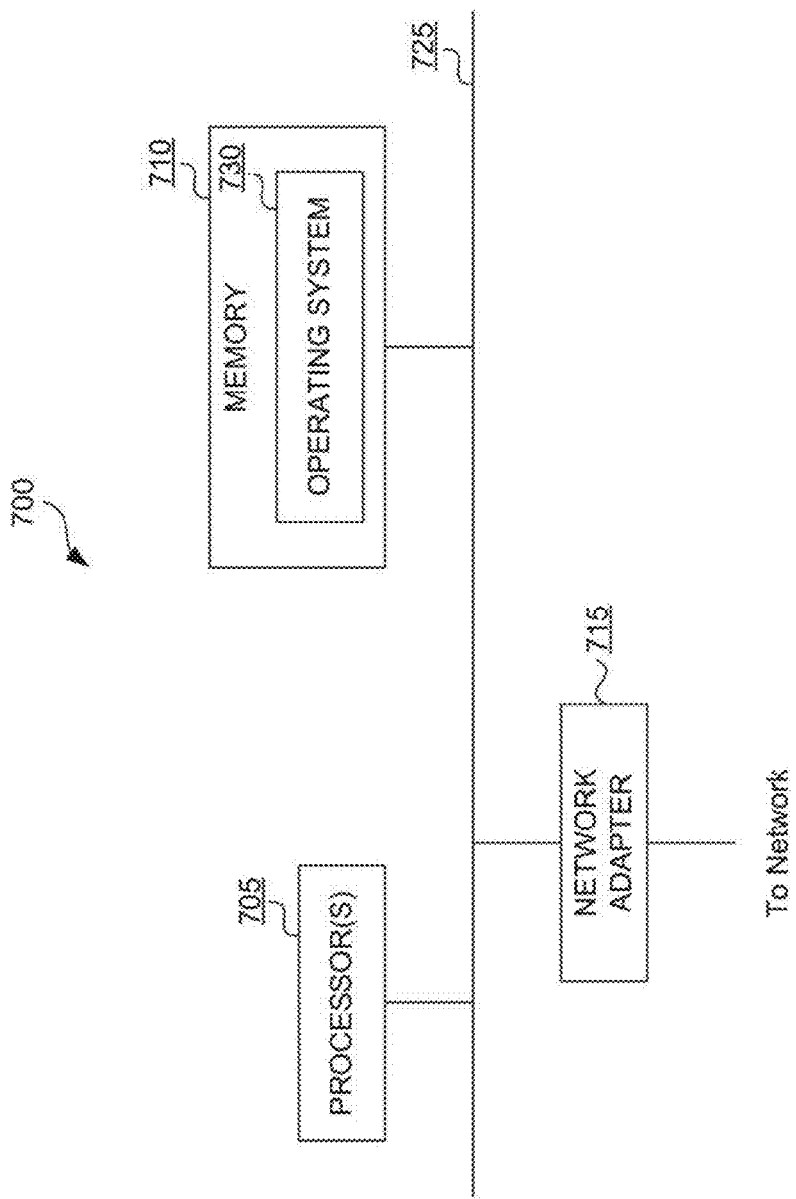
FIG. 7 is a block diagram illustrating an example of the architecture for a computer system or other control device 700 that can be utilized to implement various portions of the presently disclosed technology.

FIG. 7 is a block diagram illustrating an example of the architecture for a computer system or other control device 700 that can be utilized to implement various portions of the presently disclosed technology. In FIG. 7, the computer system 700 includes one or more processors 705 and memory 710 connected via an interconnect 725. The interconnect 725 may represent any one or more separate physical buses, point to point connections, or both, connected by appropriate bridges, adapters, or controllers. The interconnect 725, therefore, may include, for example, a system bus, a Peripheral Component Interconnect (PCI) bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 705 may include central processing units (CPUs) to control the overall operation of, for example, the host computer. In certain embodiments, the processor(s) 705 accomplish this by executing software or firmware stored in memory 710. The processor(s) 705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 710 can be or include the main memory of the computer system. The memory 710 represents any suitable form of random access memory (RAM), read-only memory (ROM), flash memory, or the like, or a combination of such devices. In use, the memory 710 may contain, among other things, a set of machine instructions which, when executed by processor 705, causes the processor 705 to perform operations to implement embodiments of the presently disclosed technology.

Also connected to the processor(s) 705 through the interconnect 725 is a (optional) network adapter 715. The network adapter 715 provides the computer system 700 with the ability to communicate with remote devices, such as the storage clients, and/or other storage servers, and may be, for example, an Ethernet adapter or Fiber Channel adapter.

The techniques described herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and/or steps in addition to or in place of what is described above. These potential additions and replacements are described throughout the rest of the specification. Reference in this specification to "various embodiments," "certain embodiments," or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. For example, some embodiments account for translational motion only, others for rotational motions only, still others account for both. As another example, some embodiments seek minimization of voxel quantity, others seek minimization of enclosed volume, still others use both techniques.

To the extent any materials incorporated by reference herein conflict with the present disclosure, the present disclosure controls.

We claim:

1. A computer-implemented method for adjusting point clouds generated using at least one scanning unit carried by a scanning platform, the method comprising:
    obtaining a base point cloud comprising a plurality of scanning points that are produced by the scanning unit during a period of time, wherein each of the scanning points indicates a position of at least a portion of a target object and wherein the target object moves relative to the scanning unit during the period of time;
    associating a motion model with the target object, wherein the motion model includes a constant speed translational motion component and a constant speed rotational motion component;
    assessing a volume measurement relating to the base point cloud based, at least in part, on application of the motion model over the period of time;
    determining one or more adjusting factors applicable to the scanning points based, at least in part, on the assessing of the volume measurement;
    transforming at least a subset of the scanning points based, at least in part, on the one or more adjusting factors to generate a corrected point cloud; and
    locating the target object based, at least in part, on the corrected point cloud.

2. A non-transitory computer-readable medium storing computer-executable instructions that, when executed, cause one or more processors associated with a scanning platform to perform actions, the actions comprising:
    obtaining a base point cloud comprising a plurality of scanning points that are produced by at least one scanning unit during a period of time, wherein each of the scanning points indicates a position of at least a portion of a target object and wherein the target object is associated with a motion model;
    determining one or more adjusting factors applicable to the scanning points based, at least in part, on the motion model, wherein determining the one or more adjusting factors comprises assessing a point cloud measurement based, at least in part, on a volume relating to the scanning points; and
    transforming at least one subset of the scanning points based, at least in part, on the one or more adjusting factors to generate an adjusted point cloud of the target object.

3. The computer-readable medium of claim 2, wherein assessing the point cloud measure comprises:
    applying the motion model to the scanning points; and
    searching for a minimized quantity of volume pixels (voxels) occupied by the scanning points at a target timepoint in accordance with the applying of the motion model.

4. The computer-readable medium of claim 3, wherein the target timepoint corresponds to the end of the period of time.

5. The computer-readable medium of claim 2, wherein assessing the point cloud measure comprises:
    applying the motion model to the scanning points; and
    searching for a minimized volume enclosed by the scanning points at a target timepoint in accordance with the applying of the motion model.

6. The computer-readable medium of claim 2, wherein the one or more adjusting factors include at least one of a translational velocity or a rotational speed.

7. The computer-readable medium of claim 2, wherein transforming the at least one subset of the scanning points comprises relocating each scanning point of the subset based, at least in part, on the one or more adjusting factors.

8. The computer-readable medium of claim 7, wherein relocating each scanning point is based, at least in part, on movements associated with the scanning point between a timepoint when the scanning point was produced and a subsequent target timepoint.

9. A non-transitory computer-readable medium storing computer-executable instructions that, when executed, cause one or more processors associated with a scanning platform to perform actions, the actions comprising:
    obtaining a base point cloud comprising a plurality of scanning points that are produced by at least one scanning unit during a period of time, wherein each of the scanning points indicates a position of at least a portion of a target object and wherein the target object is associated with a motion model, wherein a relative distance between the target object and the scanning platform changes during the period of time;
    determining one or more adjusting factors applicable to the scanning points based, at least in part, on the motion model; and transforming at least one subset of the scanning points based, at least in part, on the one or more adjusting factors to generate an adjusted point cloud of the target object.

10. The computer-readable medium of claim 9, wherein the positions indicated by at least two of the scanning points correspond to different timepoints.

11. The computer-readable medium of claim 9, wherein the positions indicated by at least two of the scanning points correspond to different portions of the target object.

12. The computer-readable medium of claim 9, wherein the scanning points are represented within a three-dimensional reference system associated with the at least one scanning unit or the scanning platform.

13. The computer-readable medium of claim 9, wherein the actions further comprise locating the target object based, at least in part, on the adjusted point cloud.

14. The computer-readable medium of claim 9, wherein the motion model includes a translational motion component.

15. The computer-readable medium of claim 14, wherein the translational motion component includes a constant translational speed factor.

16. The computer-readable medium of claim 14, wherein the translational motion component includes a non-constant translational speed factor.

17. The computer-readable medium of claim 9, wherein the motion model includes a rotational motion component.

18. The computer-readable medium of claim 17, wherein the rotational motion component includes a constant rotational speed factor.

19. The computer-readable medium of claim 17, wherein the rotational motion component includes a non-constant rotational speed factor.

20. A vehicle including a programmed controller that at least partially controls one or more motions of the vehicle, wherein the programmed controller includes one or more processors configured to:
   obtain a base point cloud comprising a plurality of scanning points that are produced by at least one scanning unit during a period of time, wherein each of the scanning points indicates a position of at least a portion of a target object and wherein the target object is associated with a motion model;
   determine one or more adjusting factors applicable to the scanning points based, at least in part, on the motion model, wherein the determining the one or more adjusting factors comprises assessing a point cloud measurement based, at least in part, on a volume relating to the scanning points; and
   transform at least one subset of the scanning points based, at least in part, on the one or more adjusting factors to generate an adjusted point cloud of the target object.

21. The vehicle of claim 20, wherein the one or more adjusting factors include at least one of a translational velocity or a rotational speed.

22. The vehicle of claim 20, wherein transforming the at least one subset of the scanning points comprises relocating each scanning point of the subset based, at least in part, on the one or more adjusting factors.

23. A vehicle including a programmed controller that at least partially controls one or more motions of the vehicle, wherein the programmed controller includes one or more processors configured to:
   obtain a base point cloud comprising a plurality of scanning points that are produced by at least one scanning unit during a period of time, wherein each of the scanning points indicates a position of at least a portion of a target object and wherein the target object is associated with a motion model;
   determine one or more adjusting factors applicable to the scanning points based, at least in part, on the motion model; and
   transform at least one subset of the scanning points based, at least in part, on the one or more adjusting factors to generate an adjusted point cloud of the target object;
   wherein the vehicle includes at least one of an unmanned aerial vehicle (UAV), a manned aircraft, an autonomous car, a self-balancing vehicle, a robot, a smart wearable device, a virtual reality (VR) head-mounted display, or an augmented reality (AR) head-mounted display.

24. The vehicle of claim 23, wherein the positions indicated by at least two of the scanning points correspond to different timepoints.

25. The vehicle of claim 23, wherein the positions indicated by at least two of the scanning points correspond to different portions of the target object.

26. The vehicle of claim 23, wherein the motion model includes at least one of a translational motion component or a rotational motion component.

27. The vehicle of claim 23, wherein the one or more processors configured to locate the target object based, at least in part, on the adjusted point cloud.

28. A computer-implemented method for adjusting point clouds generated using at least one scanning unit carried by a scanning platform, comprising:
   obtaining a base point cloud comprising a plurality of scanning points that are produced by the at least one scanning unit during a period of time, wherein each of the scanning points indicates a position of at least a portion of a target object and wherein the target object is associated with a motion model;
   determining one or more adjusting factors applicable to the scanning points based, at least in part, on the motion model, wherein determining the one or more adjusting factors comprises assessing a point cloud measurement based, at least in part, on a volume relating to the scanning points; and
   transforming at least one subset of the scanning points based, at least in part, on the one or more adjusting factors to generate an adjusted point cloud of the target object.

29. The method of claim 28, wherein assessing the point cloud measure comprises:
   applying the motion model to the scanning points; and
   searching for a minimized quantity of volume pixels (voxels) occupied by the scanning points at a target timepoint in accordance with the applying of the motion model.

30. The method of claim 28, wherein assessing the point cloud measure comprises:
   applying the motion model to the scanning points; and
   searching for a minimized volume enclosed by the scanning points at a target timepoint in accordance with the applying of the motion model.

31. The method of claim 30, wherein the target timepoint corresponds to the end of the period of time.

32. The method of claim 28, wherein the one or more adjusting factors include at least one of a translational velocity or a rotational speed.

33. The method of claim 28, wherein transforming the at least one subset of the scanning points comprises relocating each scanning point of the subset based, at least in part, on the one or more adjusting factors.

34. The method of claim 33, wherein relocating each scanning point is based, at least in part, on movements associated with the scanning point between a timepoint when the scanning point was produced and a subsequent target timepoint.

35. A computer-implemented method for adjusting point clouds generated using at least one scanning unit carried by a scanning platform, comprising:
 obtaining a base point cloud comprising a plurality of scanning points that are produced by at least one scanning unit during a period of time, wherein each of the scanning points indicates a position of at least a portion of a target object and wherein the target object is associated with a motion model, wherein a relative distance between the target object and the scanning platform changes during the period of time;
 determining one or more adjusting factors applicable to the scanning points based, at least in part, on the motion model; and
 transforming at least one subset of the scanning points based, at least in part, on the one or more adjusting factors to generate an adjusted point cloud of the target object.

36. The method of claim 35, wherein the positions indicated by at least two of the scanning points correspond to different timepoints.

37. The method of claim 35, wherein the positions indicated by at least two of the scanning points correspond to different portions of the target object.

38. The method of claim 35, wherein the scanning points are represented within a three-dimensional reference system associated with the at least one scanning unit or the scanning platform.

39. The method of claim 35, wherein the actions further comprise locating the target object based, at least in part, on the adjusted point cloud.

40. The method of claim 35, wherein the motion model includes a translational motion component.

41. The method of claim 40, wherein the translational motion component includes a constant translational speed factor.

42. The method of claim 40, wherein the translational motion component includes a non-constant translational speed factor.

43. The method of claim 35, wherein the motion model includes a rotational motion component.

44. The method of claim 43, wherein the rotational motion component includes a constant rotational speed factor.

45. The method of claim 43, wherein the rotational motion component includes a non-constant rotational speed factor.

* * * * *